United States Patent
Bosch

(10) Patent No.: US 8,481,447 B2
(45) Date of Patent: Jul. 9, 2013

(54) MANUFACTURE OF COATED MATERIALS FOR USE AS ACTIVATORS IN SULPHUR VULCANIZATION

(75) Inventor: Robert M. Bosch, Walmer (ZA)

(73) Assignee: Rubber Nano Products (Proprietary) Limited, Greenacres (ZA)

( * ) Notice: Subject to any disclaimer, the term of this patent is extended or adjusted under 35 U.S.C. 154(b) by 465 days.

(21) Appl. No.: 12/738,805

(22) PCT Filed: Oct. 16, 2008

(86) PCT No.: PCT/IB2008/054246
§ 371 (c)(1),
(2), (4) Date: Jul. 27, 2010

(87) PCT Pub. No.: WO2009/050660
PCT Pub. Date: Apr. 23, 2009

(65) Prior Publication Data
US 2010/0311914 A1    Dec. 9, 2010

(30) Foreign Application Priority Data
Oct. 18, 2007 (ZA) .................................. 2007/08955

(51) Int. Cl.
*C08F 8/34* (2006.01)
*B01J 31/20* (2006.01)

(52) U.S. Cl.
USPC .................. 502/159; 502/161; 525/332.6

(58) Field of Classification Search
USPC .................. 502/159, 161; 525/332.6
See application file for complete search history.

(56) References Cited

U.S. PATENT DOCUMENTS

| | | | | |
|---|---|---|---|---|
| 4,012,332 | A * | 3/1977 | Behrens | 502/167 |
| 7,524,560 | B2 * | 4/2009 | Paisner et al. | 428/403 |

* cited by examiner

*Primary Examiner* — Robert D. Harlan
(74) *Attorney, Agent, or Firm* — Kilpatrick Townsend and Stockton LLP

(57) ABSTRACT

This invention relates to a solid particulate substrate for use in the vulcanization of rubber and a process for the production thereof. The solid particulate substrate is coated with a coating containing a complexed acetometallate salt of sodium and a transition metal. The use of the solid particulate substrate in the vulcanization of rubber reduces the amount of transition metal oxide used in the vulcanization process.

47 Claims, 4 Drawing Sheets

MANUFACTURE OF COATED MATERIALS FOR USE AS ACTIVATORS IN SULPHUR VULCANIZATION

CROSS REFERENCE TO RELATED APPLICATIONS

The present application is a U.S. National Phase under 35 USC §371 of PCT/IB2008/054246 filed Oct. 16, 2008 which application claims the benefit of priority from South African Patent Appln No. 2007/08955 filed Oct. 18, 2007; the full disclosures of each are incorporated herein by reference in their entirety.

INTRODUCTION

The present invention relates to new materials for use as activators in the vulcanization of rubber.

BACKGROUND TO THE INVENTION

The use of zinc oxide in rubber vulcanization is essential as it plays an important role in activating the vulcanization reaction by its role as an intermediate in the reactions of the accelerators, sulphur and the rubber. Also, zinc oxide increases the modulus of the rubber and acts a heat sink allowing better ageing properties of the rubber. The amount of zinc oxide used in rubber vulcanization is essentially in the range of 2 to 5 parts per hundred of rubber by mass. Considering the toxicity of zinc oxide to aquatic systems and current environmental considerations, it has become desirous to limit the amount of zinc oxide used in rubber vulcanization or replace it altogether.

It is an object of the invention to reduce the amount of zinc oxide in the vulcanization of rubber.

SUMMARY OF THE INVENTION

Figure 1:
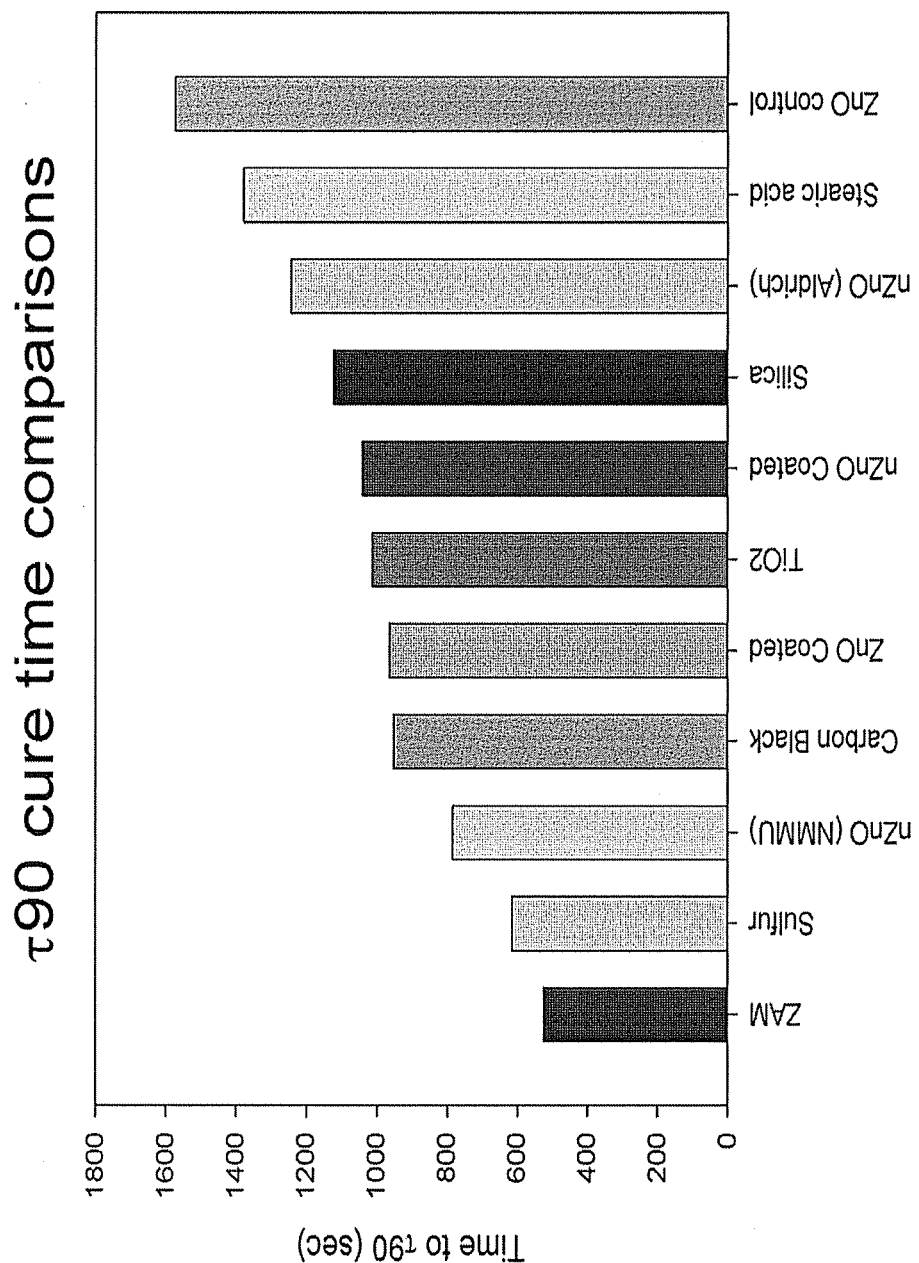
FIG. 1 is a graph showing comparison of cure times achieved using different coated activators of the invention in comparison to ZnO in rubber vulcanization.

A first aspect of the present invention relates to a solid particulate substrate coated with a coating containing a complexed acetometallate salt of sodium and transition metal, typically for use in the vulcanization of rubber.

The transition metal is preferably cadmium or zinc, most preferably zinc.

The coating preferably contains a capping agent.

The capping agent is preferably a non-polar capping agent selected from 2-mercaptobenzothiazole (MBT), zinc bis(N,N-dimethyldithiocarbamate (ZDMC), diphenylguanidine (DPG), bis-benzothiazole-2,2'-disulfide, N-oxydiethylene-2-benzothiazole-sulfenamide, N-oxydiethylenethiocarbomoyl-N-oxydiethylene sulfenamide, tetramethyl thiuram disulfide, tetramethyl thiuram monosulfide, tetraethyl thiuram disulfide, tetraethyl thiuram monosulfide, tetrabenzyl thiuram disulfide, tetrabenzyl thiuram monosulfide, tetrabutyl thiuram disulfide, tetrabutyl thiuram monosulfide, tetraisopropyl thiuram disulfide, tetraisopropyl thiuram monosulfide, N-cyclohexylthiophthalimide, N-cyclohexyl-2-benzothiazole sulfenamide, N-tert-butyl-2-benzothiazole sulfenamide, 4-morpholinyl-2-benzothiazole disulfide, dipentamethylene thiuram disulfide, dipentamethylene thiuram monosulfide, dipentamethylene thiuram tetrasulfide, 4,4'-dithiomorpholine, 2-mercaptotoluimidazole, ethylene thiourea, trimethylthiourea, 1,3-diethylthiourea, and 1,3-dibutylthiourea, and combinations thereof.

Preferred non-polar capping agents are 2-mercaptobenzothiazole (MBT); and zinc bis(N,N-dimethyldithiocarbamate (ZDMC).

The capping agent may be a combination of capping agents, for example a 1:1 DPG-MBT reaction product.

The solid particulate substrate may comprise particles less than 1 micrometer in size, typically less than 100 nm in size, for example 15 to 100 nm in size.

The solid particulate substrate is preferably selected from a material that does not hydrolyse and preferably has a surface area in the range of >20 m2 per gram, for example it may be selected from sulphur, stearic acid, silica, carbon black, titanium dioxide, magnesium oxide, or low weight polymers.

The solid particulate substrate coated with a complex acetometallate salt of sodium and transition metal may be further coated with a hydrophobic coating, for example a low melting point wax (melting point of 35 to 70, typically 47 to 65° C.), typically a wax comprising an ester of saturated fatty acids. The solid particulate substrate coated with a complex acetometallate salt of sodium and transition metal is typically with a hydrophobic coating at a ratio (by weight) of 1:50 to 1:150, typically 1:100.

A second aspect of the invention relates to a process for producing the coated solid particulate substrate typically for use in the vulcanization of rubber, said process including the steps of:
  providing a solution containing a complex acetometallate salt of sodium and transition metal; and
  coating the solid particulate substrate with the solution.

In accordance with an embodiment of the invention, a solution containing a complex acetometallate salt of sodium and transition metal may be prepared by separating a supernatant solution containing ultra fine, preferably non-polar capped, nano transition metal oxides and/or sulphides, from a solution containing solid transition metal oxides and/or sulphides.

The solution containing a complex acetometallate salt of sodium and transition metal may be prepared by:
1. providing a ternary solvent system comprising a polar solvent, a non-polar solvent and an intermediate solvent allowing miscibility of all three components;
2. providing a mixture of a transition metal salt and the ternary solvent;
3. providing a mixture of a suitable source of oxide or sulphide and the ternary solvent;
4. if necessary providing a mixture of a non-polar end capping agent and the non-polar solvent;
5. mixing the mixtures to provide a solution containing transition metal oxide or sulphide particles; and
  separating the transition metal oxide or sulphide particles from the solution to provide a solution containing complex acetometallate salt of sodium and transition metal.

Typically, the solution containing complex acetometallate salt of sodium and transition metal is removed from the transition metal oxide or sulphide particles as a supernatant solution.

Preferably, non polar solvent is removed from the solution containing a complex acetometallate salt of sodium and transition metal, to provide an aqueous solution.

Any soluble transition metal salt can be used but preferably the transition metal salt is zinc acetate or cadmium acetate, most preferably zinc acetate.

A suitable source of oxide or sulphur can be any one of NaOH, LiOH, KOH, $NH_4OH$, $Na_2S$, $Li_2S$, $K_2S$, $H_2S$ and thioacetamide, preferably NaOH.

The non-polar capping agent may be selected from 2-mercaptobenzothiazole (MBT), zinc bis(N,N-dimethyldithiocarbamate (ZDMC), diphenylguanidine (DPG), bis-benzothiazole-2,2'-disulfide, N-oxydiethylene-2-benzothiazolesulfenamide, N-oxydiethylenethiocarbomoyl-N-oxydiethylene sulfenamide, tetramethyl thiuram disulfide, tetramethyl thiuram monosulfide, tetraethyl thiuram disulfide, tetraethyl thiuram monosulfide, tetrabenzyl thiuram disulfide, tetrabenzyl thiuram monosulfide, tetrabutyl thiuram disulfide, tetrabutyl thiuram monosulfide, tetraisopropyl thiuram disulfide, tetraisopropyl thiuram monosulfide, N-cyclohexylthiophthalimide, N-cyclohexyl-2-benzothiazole sulfenamide, N-tert-butyl-2-benzothiazole sulfenamide, 4-morpholinyl-2-benzothiazole disulfide, dipentamethylene thiuram disulfide, dipentamethylene thiuram monosulfide, dipentamethylene thiuram tetrasulfide, 4,4'-dithiomorpholine, 2-mercaptotoluimidazole, ethylene thiourea, trimethylthiourea, 1,3-diethylethiourea, and 1,3-dibutylthiourea, and combinations thereof.

Preferred non-polar capping agents are 2-mercaptobenzothiazole (MBT); and zinc bis(N,N-dimethyldithiocarbamate (ZDMC).

The capping agent may be a combination of capping agents, for example a 1:1 DPG-MBT reaction product. The reaction product of MBT and DPG is typically formed at 150° C. and reacted for 5 min then allowed to cool and form a solid.

The solid particulate substrate is preferably selected from a material that does not hydrolyse and preferably has a surface area in the range of >20 m2 per gram, for example it may be selected from sulphur, stearic acid, silica, carbon black, titanium dioxide, magnesium oxide, or low weight polymers.

The solid particulate substrate may comprise particles less than 1 micro meter in size, typically less than 100 nm in size, for example from 15 nm to 100 nm.

The amount of supernatant solution that is used for coating the solid substrate may be determined according to a coating ratio in the range of from 1:100 to 1:10000, typically 1:1000, this coating ratio is expressed as the initial mass of transition metal salt: mass of the substrate.

The solid particulate substrate coated with a complex acetometallate salt of sodium and transition metal may be further coated with a hydrophobic coating, for example a low melting point wax (melting point of 35 to 70, typically 47 to 65° C.), typically a wax comprising an ester of saturated fatty acids. The solid particulate substrate coated with a complex acetometallate salt of sodium and transition metal is typically with a hydrophobic coating at a ratio (by weight) of 1:50 to 1:150, typically 1:100.

According to a third aspect of the present invention there is provided a rubber composition containing a filler comprising at least one rubber containing olefinic unsaturation and an inert solid particulate substrate coated with a complex acetometallate salt of sodium and transition metal as described above.

According to a fourth aspect to the present invention there is provided a method of processing a rubber composition containing at least one rubber containing olefinic unsaturation with an inert solid particulate substrate coated with a complex acetometallate salt of sodium and transition metal as described above.

DETAILED DESCRIPTION OF THE INVENTION

WO 2007/135649 (the content of which is incorporated herein by reference) describes a process of producing non-polar capped nano transitional metal oxide, including zinc oxide, and the use of these transitional metal oxides in the process of rubber vulcanization. The supernatant solution recovered from the process described above contains residual material, which contains a complex acetometallate salt of sodium and transition metal. It is believed that the nano metal oxide surface (nano zinc oxide) in the process to catalyses the formation of the acetometallate complex. It has now, unexpectedly, been found that by coating substrates which are relatively inert to a water/alcohol mixture using the supernatant solution, these coated substrates can be used as activators in rubber vulcanization.

A solution containing a complex acetometallate salt of sodium and transition metal may be prepared by:
1. providing a ternary solvent system comprising a polar solvent, a non-polar solvent and an intermediate solvent allowing miscibility of all three components;
2. providing a mixture of a transition metal salt and the ternary solvent;
3. providing a mixture of a suitable source of oxide or sulphide and the ternary solvent;
4. if necessary providing a mixture of a non-polar end capping agent and the non-polar solvent;
5. mixing the mixtures to provide a solution containing transition metal oxide or sulphide particles; and
6. separating the transition metal oxide or sulphide particles from the solution to provide a solution containing a complex acetometallate salt of sodium and transition metal.

Although the ternary solvent system described above comprises water/isopropanol/dichloromethane, the solvent system used can be related to any three component system in which one component is polar, the other component is non-polar and an intermediate solvent is used to allow miscibility of all three components. Preferably the solvent is a water/alcohol/chlorinated alkane system. In one embodiment of the present invention, a mixture of water, iso-propanol and dichloromethane is used. The water and iso-propanol allow dissolution of zinc acetate (or other transition metal salt) and sodium hydroxide while the dichloromethane allows dissolution of the vulcanization accelerator, MBT. However, it will be appreciated that any other suitable solvents will accomplish the same effects (such as ethanol, methanol, n-propanol, ethylene glycol, butanol, chloroform and dichloroethane). Preferably a ratio of 60:30:10 of isopropanol:water:dichloromethane is used. It, however, will be appreciated that any suitable miscible ratio can be used. Preferably the dichloromethane does not exceed 20% parts by weight, more preferably not more than 15% parts by weight, most preferably not more than 10% parts by weight. Beyond these values the system is no longer miscible and separates into 2 phases. Preferably dichloromethane is present in an amount of 1-10% parts by weight. Increasing the water also limits dichloromethane solubility. In a preferred embodiment of the present invention, the system includes 60-80% isopropanol, 20-30% water and 1-10% dichloromethane (all parts by weight).

Any soluble transition metal salt can be used but preferably the transition metal salt is zinc acetate or cadmium acetate, most preferably zinc acetate.

A suitable source of oxide or sulphur can be any one of NaOH, LiOH, KOH, NH$_4$OH, Na$_2$S, Li$_2$S, K$_2$S, H$_2$S and thioacetamide, preferably NaOH.

The non-polar end capping agent is preferably useful in rubber vulcanization, for example:

2-mercaptobenzothiazole (MBT) to activate sulfenamide cures; and zinc bis(N,N-dimethyldithiocarbamate (ZDMC) to activate thiuram cures.

Other suitable end capping agents include: diphenylguanidine (DPG), bis-benzothiazole-2,2'-disulfide, N-oxydiethylene-2-benzothiazole-sulfenamide, N-oxydiethylenethiocarbomoyl-N-oxydiethylene sulfenamide, tetramethyl thiuram disulfide, tetramethyl thiuram monosulfide, tetraethyl thiuram disulfide, tetraethyl thiuram monosulfide, tetrabenzyl thiuram disulfide, tetrabenzyl thiuram monosulfide, tetrabutyl thiuram disulfide, tetrabutyl thiuram monosulfide, tetraisopropyl thiuram disulfide, tetraisopropyl thiuram monosulfide, N-cyclohexylthiophthalimide, N-cyclohexyl-2-benzothiazole sulfenamide, N-tert-butyl-2-benzothiazole sulfenamide, 4-morpholinyl-2-benzothiazole disulfide, dipentamethylene thiuram disulfide, dipentamethylene thiuram monosulfide, dipentamethylene thiuram tetrasulfide, 4,4'-dithiomorpholine, 2-mercaptotoluimidazole, ethylene thiourea, trimethylthiourea, 1,3-diethylethiourea, and 1,3-dibutylthiourea.

The capping agent may be a combination of capping agents, for example a 1:1 ratio DPG-MBT reaction product (DPG-MBT) to activate guanidine cures. The reaction product of MBT and DPG is formed at 150° C. and reacted for 5 min then allowed to cool and form the solid.

This invention allows for creation of an activator that is specifically chemically enhanced to activate the different types of accelerators used. This means it can be "capped" to activate sulfenamide, thiuram and guanidine type accelerated sulphur vulcanization. It can be "capped" to activate all of these systems or any specific system. This is done in practice to allow different types of finished product that are specific to their accelerator system.

In one embodiment of the present invention, step 5 comprises mixing 2 and 3 to create a mixture 5 and adding 4 to 5. In an alternate embodiment of the present invention step 5 is replaced by adding a portion, e.g. half of 4 to 2. 3 and 4 are then added alternately to precipitate the oxide or the sulphide.

In a preferred embodiment of the present invention, the solvent system is premixed and then divided into two equal portions. In one portion the transition metal salt, for example, zinc acetate is dissolved and in the other portion the source of oxide or sulphide, for example, sodium hydroxide is dissolved. A small portion of dichloromethane is used to dissolve the MBT or other suitable non-polar capping agent. The amounts of reagents are preferably stoichiometrically determined. The amount of MBT used is usually no more than 0.15 times the zinc acetate amount, preferably no more than 0.12 times, most preferably no more than 0.10 times the zinc acetate amount.

It is envisaged that any suitable agent can be used to perform this capping role. Most rubber accelerators and active ingredients are non-polar.

The temperature and time of reaction can be varied and should allow some control of the actual crystals formed. The normal reaction temperature of a zinc acetate mixture is between 30 and 50 degrees Centigrade (° C.) which temperature facilitates the solubility of the zinc acetate in the solvent mixture.

Because it is a ternary system the boiling point of dichloromethane is increased and it does not boil away. The temperature of the reaction can be as low as 0° C. but at lower temperatures less capping agent dissolves. As such, the method works between the freezing point and boiling point of the ternary solvent mixture prepared.

The time of the reaction is preferably no longer than 60 seconds, more preferably no longer than 40 seconds and most preferably no longer than 30 seconds before the non-polar capping agent, for example MBT solution, is added. The time of the reaction is preferably greater than 2 seconds, more preferably greater than 5 seconds, more preferably greater than 10 seconds and most preferably greater than 15 seconds.

The resultant sol-gel is preferably then heated under vacuum to allow the non-polar solvent, for example dichloromethane, to be removed and the solid nano teriary metal oxide or sulphide is allowed to settle and is removed from the supernatant solution of water/isopropanol to provide a solution containing a complex acetometallate salt of sodium and transition metal.

The supernatant is further diluted to allow complete wetting of the solid substrate. Any water-miscible solvent that is inert to the substrate to be coated can be used for this purpose. The preferred solvent is isopropanol, which is easier to evaporate and dry.

To this diluted solution is added an inert solid substrate to form a mixture. The solid particulate substrate should have a high surface area (for example in the range of >20 m2 per gram) and may be selected from any material that does not hydrolyse. Suitable substrates are sulphur, stearic acid, silica, carbon black, titanium dioxide, or low weight polymers.

The amount of supernatant that is used for coating the solid substrate is determined according to a coating ratio. This coating ratio is expressed as the initial mass of transition metal salt:mass of the substrate. This ratio may be in the range of from 1:100 to 1:10000, typically 1:1000. This value will vary according to the surface are of the solid added to the solution.

After complete coating, the mixture is dried under vacuum (this method of drying allows for the solvents to be reused). An inert solid particulate substrate (comprising particles less than 1 micro meter in size, typically less than 100 nm in size) and coated with a complex acetometallate salt of sodium and transition metal.

In accordance with a preferred embodiment of the invention, the inert solid particulate substrate coated with a complex acetometallate salt of sodium and transition metal is further coated with a hydrophobic coating, for example a low melting point wax (melting point of 47 to 65° C.), typically a wax comprising an ester of saturated fatty acids. The solid particulate substrate coated with a complex acetometallate salt of sodium and transition metal is typically with a hydrophobic coating at a ratio (by weight) of 1:50 to 1:150, typically 1:100.

The inert solid particulate substrate coated with a complex acetometallate salt of sodium and transition metal and preferably further coated with a hydrophobic coating may then be used in methods of preparing rubber compositions as described in WO 2007/135650 (the content of which is incorporated herein by reference).

Thus, according to a third aspect to the present invention there is provided a rubber composition containing a filler comprising at least one rubber containing olefinic unsaturation and an inert solid particulate substrate coated with a complex acetometallate salt of sodium and transition metal.

The rubber composition may be a sulphur-vulcanized rubber composition. The sulphur-vulcanized rubber composition may be prepared by heating the rubber composition according to the invention to a temperature of 100° C. or greater to 200° C. or less in the presence of a sulphur-vulcanizing agent.

According to a fourth aspect to the present invention there is provided a method of processing a rubber composition containing at least one rubber containing olefinic unsaturation with an inert solid particulate substrate coated with a complex acetometallate salt of sodium and transition metal. The method of processing the rubber composition containing at least one rubber containing olefinic unsaturation and an inert solid particulate substrate coated with a complex acetometallate salt of sodium and transition metal may include processing with a processing additive.

The term "phr" as used herein, and according to conventional practice, refers to "parts by weight of a respective material per 100 parts by weight of rubber, or elastomer."

The rubber composition may comprise less than 2 phr, preferably less than 1.9 phr, more preferably less than 1.8 phr, most preferably less than 1.7 phr of the an inert solid particulate substrate coated with ultra fine functionalized nano transitional metal oxide and/or sulfide particles. It will be appreciated that higher loadings may be used, although such higher loadings are counterintuitive to the aim of the present invention. The rubber composition may include greater than 0.1 phr, preferably greater than 0.2 phr, more preferably greater than 0.3 phr and most preferably greater than 0.5 phr of an inert solid particulate substrate coated with ultra fine functionalized nano transitional metal oxide and/or sulfide particles.

In a preferred aspect of this invention, the inert solid particulate substrate coated with ultra a complex acetometallate salt of sodium and transition metal has a diameter of less than 100 nanometers.

The inert solid particulate substrate coated with a complex acetometallate salt of sodium and transition metal may be used to process sulphur-vulcanizable rubbers or elastomers containing olefinic unsaturation. The phrase "rubber or elastomer containing olefinic unsaturation" is intended to include both natural rubber and its various raw and reclaim forms as well as various synthetic rubbers, including but not limited to synthetic polyisoprene, polybutadiene and styrene butadiene rubber. In the description of this invention, the terms "rubber" and "elastomer" may be used interchangeably, unless otherwise prescribed. The terms "rubber composition", "compounded rubber" and "rubber compound" are used interchangeably to refer to rubber which has been blended or mixed with various ingredients and materials and such terms are well known to those having skill in the rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Specific examples of synthetic rubbers include neoprene (polychloroprene), polybutadiene (including cis 1,4-polybutadiene), polyisoprene (including cis 1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include silicon-coupled and tin-coupled star-branched polymers. The preferred rubber or elastomers are polyisoprene, polybutadiene and SBR.

In one embodiment of the present invention, the rubber composition is comprised of at least two of diene based rubbers. A combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, c is 1,4-polybutadiene rubbers and emulsion polymerization prepared butadiene/acrylonitrile copolymers. The 3,4-polyisoprene rubber (3,4-PI) is considered beneficial for a purpose of enhancing a tyre's traction when it is used in a tyre tread composition. The 3,4-PI, and use thereof, is more fully described in U.S. Pat. No. 5,087,668. The cis 1,4-polybutadiene rubber (BR) is considered to be beneficial for a purpose of enhancing a tyre tread's wear.

It is readily understood by those having skill in the art that the rubber composition can be compounded by methods generally known in the rubber compounding art, such as mixing the various sulphur-vulcanizable constituent rubbers with various commonly used additive materials such as, for example, sulphur donors, curing aids, such as accelerators, activators and retarders, and processing additives, such as oils, resins including tackifying resins and plasticizers, fillers, pigments, fatty acid, waxes, antioxidants and antiozonants and peptizing agents.

As known to those skilled in the art, depending on the intended use of the sulphur vulcanizable and sulphur-vulcanized material (rubbers), the additives mentioned above are selected and commonly used in conventional amounts. Representative examples of sulphur donors include elemental sulphur (free sulphur), an amine disulfide, polymeric polysulfide and sulphur olefin adducts. Preferably, the sulphur-vulcanizing agent is elemental sulphur. The sulphur-vulcanizing agent may be used in an amount ranging from 0.5 to 8 phr, with a range of from 1.5 to 6 phr being preferred. Typical amounts of tackifier resins, if used, comprise 0.5 to 10 phr, usually 1 to 5 phr. Typical amounts of processing aids comprise 1 phr to 50 phr. Such processing aids can include, for example, aromatic, naphthenic, and/or paraffinic processing oils. Typical amounts of antioxidants comprise 1 to 5 phr. Representative antioxidants may be, for example, diphenyl-p-phenylenediamine and others, such as, for example, those disclosed in *The Vanderbilt Rubber Handbook* (1978), pages 344 to 346. Typical amounts of antiozonants comprise 1 to 5 phr. Typical amounts of fatty acids, if used, which can include stearic acid comprise 0.5 to 3 phr. Typical amounts of waxes comprise 1 to 5 phr. Often microcrystalline waxes are used. Typical amounts of peptizers comprise 0.1 to 1 phr. Typical peptizers may be, for example, pentachlorothiophenol and dibenzamidodiphenyl disulfide.

Whereas the functionalized nano transition metal oxide and/or sulphide particles described in WO 2007/135650 increase the modulus of the rubber and act as a heat sink, inert solid particulate substrate coated with a complex acetometallate salt of sodium and transition metal, of the present invention, only acts as an activator in the rubber vulcanization reaction. Thus, it is necessary to include further substances to offer these properties to the final rubber product.

Therefore, the formulation also comprises a modulus increasing agent. The modulus increasing agent may by a metal methacrylate such as zinc methacrylate, or other metal methacrylates. Preferred zinc methacrylates are ZDMA and/or ZMMA zinc acrylate. The formulation may comprise from 1-5 phr of the modulus increasing agent.

In addition the formulation further comprises:
a bulking agent and density increasing agent. The bulking agent and density increasing agent is typically barium sulphate and may comprise from 0-5 phr of the formulation; and a metal oxide such as calcium oxide as a drying agent to protect the active ingredient.

In one embodiment of the first aspect of the present invention, the rubber composition is sulphur-cured or vulcanized. Accelerators may be used to control the time and/or temperature required for vulcanization and to improve the properties of the vulcanizate.

The rubber composition of the invention for various purposes. For example, rubber composition, preferably sulphur-vulcanized, may be in the form of a tyre, belt or hose. In case of a tyre, it can be used for various tyre components. Such tyres can be built, shaped, molded and cured by various methods which are known and will be readily apparent to those having skill in such art. Preferably, the rubber composition is used in the tread of a tyre. As can be appreciated, the tyre may be a passenger tyre, aircraft tyre, truck tyre and the like. Preferably, the tyre is a passenger tyre. The tyre may also be a radial or bias, with a radial tyre being preferred.

In summary, the present invention allows an unprecedented reduction of transition metal oxide and/or sulfide in the rubber composition, if desired, without negative impact on the following curing or vulcanization process due to the high dispersivity and high chemical activity of the nanoscaled transition metal oxide and/or sulfide particles. In addition, the inclusion of further accelerants can be avoided, if desired.

In a further embodiment of the present invention, an inert solid particulate substrate coated with ultra fine functionalized nano transitional metal oxide and/or sulfide particles may be added to a master-batch including at least one polymer. The preparation of such a master-batch is described in more detail in U.S. Pat. No. 6,555,606, the content of which is included herein by reference. Preferably, the polymer is one of the polymers intended to be added to the rubber composition. This master-batch is then mixed with a prepared rubber composition, preferably in the non-productive stage. The amount of an inert solid particulate substrate coated with ultra fine functionalized nano transitional metal oxide and/or sulfide particles in the master batch is such that the rubber composition comprises 0.1 to 1.0 phr, for example 0.8 phr, 0.6 phr or 0.4 phr correct, of transition metal oxide and/or sulfide after mixing.

Again, this process allows an unprecedented reduction of transition metal oxide and/or sulfide in the rubber composition, without negative impact on the following curing or vulcanization process due to the high dispersivity and chemical activity of the nanoscaled transition metal oxide and/or sulfide particles.

The invention will now be described with reference to the following non-limiting examples.

EXAMPLES

Example 1

22.4 g of zinc acetate was reacted with 8.1 g of NaOH. 0.017 g of MBT and 0.031 g of ZDMC are used as capping agents. Solvent mixture of 2800 ml Isopropanol, 1400 ml of water, and 350 ml of dichloromethane was prepared. 50 ml of this dichloromethane is added into the water/isopropanol mixture. 300 ml was used to dissolve the capping agents. The solvent mixture was heated to 50° C. The mixture was then divided into two equal halves and the zinc acetate and sodium hydroxide were dissolved separately into the respective mixtures. The vessels A and B are now mixed together and allowed to react for 30 to 60 seconds. The capping agent was then added. The heating is now increased to allow the dichloromethane to be evaporated and collected off. After the solution had lost all the dichloromethane (noticed as volume reduction) the solution was then cooled and allowed to stand. The solid nano zinc oxide settled at the bottom of the reaction flask. The supernatant was decanted off from the vessel and the reaction solution was then used to activate the chosen substrate (these are reflected in FIG. 1).

For 220 g of zinc acetate used ~80 g of nano zinc oxide is formed, ~160 g of sodium acetate and a small amount of the acetometallate. Typically less than a gram per reaction of that size. The volume of solvent is typically 2 liters total solvent for 20 g of ZnAc used.

The solution was then dried and solvent reclaimed leaving the dried and inert solid particulate substrate coated with ultra fine functionalized nano zinc oxide particles.

Example 2

Figure 2:
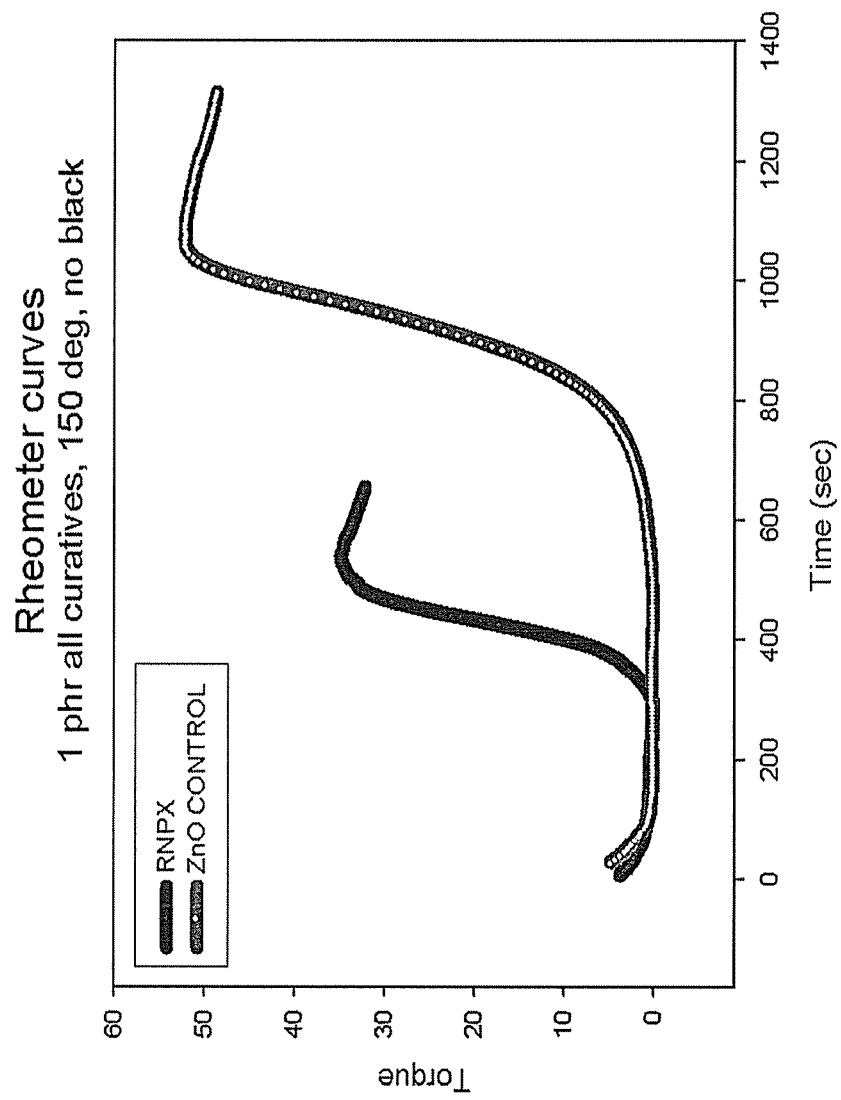
FIG. 2 is a graph showing a rheometer curve of a coated activator of the invention in comparison to a zinc oxide control.
Figure 3:
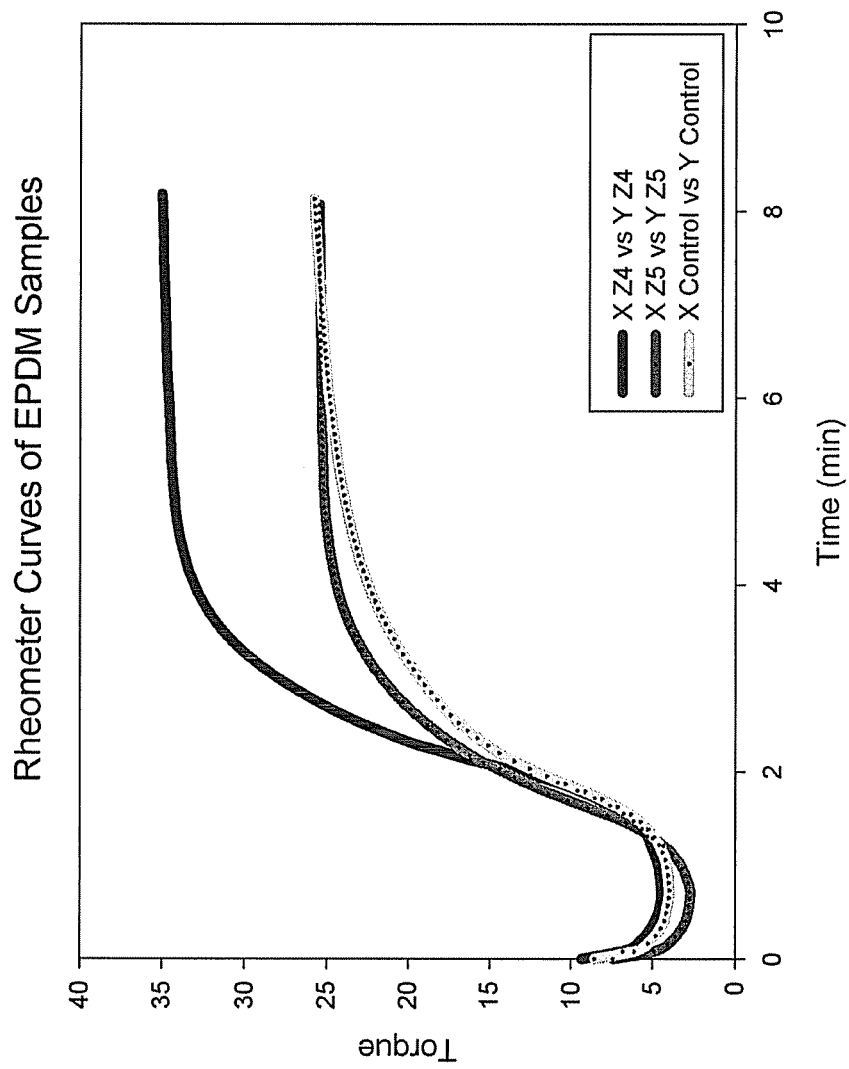
FIG. 3 is a graph showing rheometer axis of coated activators of the invention in comparison to controls.

A functionalized silica was formed by Example 1. After the aqueous solution was formed and the nano zinc oxide was removed 2000 g of silica with sufficient isopropanol to wet the silica was added. This batch was then dried and the active silica for sulfur vulcanization is shown in FIG. 2. The activated silica is reflected as RNPX.

Example 3

FIG. 1 shows a comparison of cure times achieved using different coated substrates as activators in rubber vulcanization in comparison to ZnO (standard zinc oxide in normal use). The coating ratio was 1 to 100 by mass. (this relates to the amount of precursor zinc acetate in the reaction to the amount of substrate coated. Meaning for 1 g ZnAc reacted 100 g of substrate can be coated—the real coating ratio of active material to substrate is a lot lower since the actual yield of the product is low as most of the material converts from ZnAc to ZnO. A small component (i.e. <5%) then forms the Zinc Sodium acetometallate. The rubber in this case is IR Isoprene rubber and the curative ZMBT (zinc mercaptobenzothiazole salt).

The graph shows coated sulphur, carbon black, TiO2, silica and stearic acid. The sizes of the particles are a range from nano size (for Carbon black varying by grade) to micrometer sizes in the sulphur and stearic etc. Note that stearic acid melts at curing temperature as well as sulphur. The TiO2, has a size of roughly 8-300 nm (depending on grade and supplier). Silica is precipitated and has a size range of 5-40 nm. nZnO is coated nano zinc oxide prepared by the process described in WO 2007/135649. ZnO is normal zinc oxide coated according to the invention, and nZnO is nano zinc oxide obtained from Aldrich and coated according to the invention.

FIG. 1 shows that the replacement of zinc oxide with the coated substrates obtained by the process of the invention, results in decreased cure time. ZAM results from residual capping agent. The scorch time is unsafe and not of practical use.

Example 4

FIG. 2 is an example of how RNPX (activated silica described in Example 2) behaves as an activator for rubber vulcanization. The torque response is lower, but the time is quicker in comparison with a ZnO control. It should be noted that this is a simple 1 part of all curatives (CBS and sulphur) with 1 part of activator.

The modulus of the rubber is not increased by this material, it only activates the vulcanization reaction, the addition of further agents is required to increase the modulus. This is independent of the activator loading, and unique to this activation system as the zinc oxide levels determine activation and modulus synergistically.

Example 5

The invention replaces the ZnO in the control samples at a ratio of 1 phr of RNPX the liquid activator for the standard mass of ZnO (typically 3 phr). This has a modulus increasing agent added and the properties are determined in comparison with the ZnO control materials. They are shown to be favourable. This is done for Tables 1-7 below. RNPX is the liquid system that replaces the ZnO in the control rubbers. Modulus agents include CaO, MgO, and ZMMA (zinc methacrylate).

Table 1 below is a standard tensile rubber tread formulation.

TABLE 1

| TREAD | Phr |
| --- | --- |
| NR | 100.00 |
| N550 | 57.00 |
| Paraf Oil | 20.00 |
| S8 | 1.70 |
| TBBS | 1.70 |
| TMTD | 0.20 |
| HSt | 2.00 |
| ZnO | 3.00 |

Tables 2 and 3 below show the standard formulation of Table 1 in comparison with formulations where the ZnO is removed and replaced with RNPX (activated silica from Example 2) and that ZnO can be effectively replaced with the coated particles of the invention.

TABLE 2

| Compound | ZnO Content | Notes |
| --- | --- | --- |
| Tensile Rubber Control | 100% | Standard Control |
| Tread RnPX (no modulus) | 0% | 1 phr RNPX, No ZnO |
| Tread RnPX 0.1ZnO/3phr S8 | 3% | Restore some modulus with ZnO and S8 increase |
| Tread 3 phr S8/0.1 phr RNPX | 0% | Lower RNPX levels |
| Tread (2 phr CaO/5 phr Al2O3/1 phr RNPX) | 0% | Modulus agents added |

TABLE 3

| | UTS | Stdev | Mod 100 | Mod 200 | Mod 300 | Ext at break | Strain brk |
| --- | --- | --- | --- | --- | --- | --- | --- |
| Tensile Rubber Control | 19.77 | 2.40 | 2.615 | 6.883 | 12.793 | 328.20 | 422.20 |
| Tread RnPX (no modulus) | 12.83 | 0.27 | 1.252 | 3.132 | 6.222 | 428.37 | 490.77 |
| Tread RnPX 0.1ZnO/3 phr S8 | 20.18 | 0.63 | 1.880 | 5.285 | 10.359 | 435.43 | 480.27 |
| Tread 3 phr S8/0.1 phr RNPX | 16.65 | 1.79 | 1.515 | 4.482 | 8.806 | 393.23 | 367.43 |
| Tread (2 phr CaO/5 phr Al2O3/1 phr RNPX) | 20.04 | 0.66 | 1.510 | 4.209 | 8.689 | 451.87 | 485.17 |

Table 4 below is a standard vehicle door and window seal rubber formulation.

TABLE 4

| EPDM | Phr |
| --- | --- |
| Keltan 8340 | 100.00 |
| Paraffinic Oil | 110.00 |
| N550 | 175.00 |
| CaO | 12.00 |
| ZDBC | 2.00 |
| MBTS | 0.75 |
| MBT | 0.75 |
| TMTD | 1.00 |
| S8 | 1.50 |
| ZnO | 4.00 |
| HSt | 1.00 |

Tables 5, 6 and 7 below show the standard formulation of Table 4 in comparison with formulations where the ZnO is removed and replaced with RNPX (activated silica from Example 2) and that ZnO can be effectively replaced with the coated particles of the invention.

TABLE 5

| Compound | ZnO | Notes |
| --- | --- | --- |
| EPDM Control | 100% | Standard EPDM |
| EPDM RNPX replacing ZnO (No modulus) | 0% | No modulus, 1 phr RNPX |
| EPDM CBS only | 0% | No modulus, 2 phr CBS for all curatives |
| EPDM (ZMMA 100) | 31% | ZMMA as modulus, 1phr RNPX |
| EPDM (ZMMA 55) | 16% | Lower ZMMA with Barites, 1 phr RNPX |

TABLE 6

| | UTS | Stdev | Mod 100 | Mod 200 | Mod 300 | Ext at break | Strain brk |
| --- | --- | --- | --- | --- | --- | --- | --- |
| EPDM Control | 9.26 | 0.41 | 0.297 | 0.608 | 0.865 | 263.23 | 377.43 |
| EPDM RNPX replacing ZnO (No modulus) | 3.03 | 0.02 | 0.160 | 0.264 | 0.322 | 235.00 | 397.93 |
| EPDM CBS only | 3.84 | 0.01 | 0.139 | 0.256 | 0.346 | 285.03 | 397.93 |
| EPDM (ZMMA 100) | 10.41 | 0.42 | 0.385 | 0.710 | 0.986 | 259.73 | 377.17 |
| EPDM (ZMMA 55) | 9.20 | 0.21 | 0.275 | 0.564 | 0.803 | 307.03 | 450.70 |

TABLE 7

| Sample | Min Torque | Max Torque | Scorch time (sec) | Time to Max Torque (sec) | T90 |
|---|---|---|---|---|---|
| EPDM Control | 4.2 | 26 | 1'12" | 8'30" | 4'42" |
| EPDM Z4 | 4.8 | 35 | 1'18" | 7'05" | 3'23" |
| EPDM Z5 | 2.8 | 25.5 | 1'03" | 7'00" | 3'30" |

Example 6

A reaction process as described in Example 1 is initiated with zinc acetate and sodium hydroxide. The capping agents are modified to include MBT (mercaptobenzothiazole) and DPG (diphenyl guanidine).

The solid substrate chosen for this reaction is magnesium oxide light (a very high surface area nano-particle of MgO). The standard process of drying by heating to 105° C. in air is used.

Figure 4:
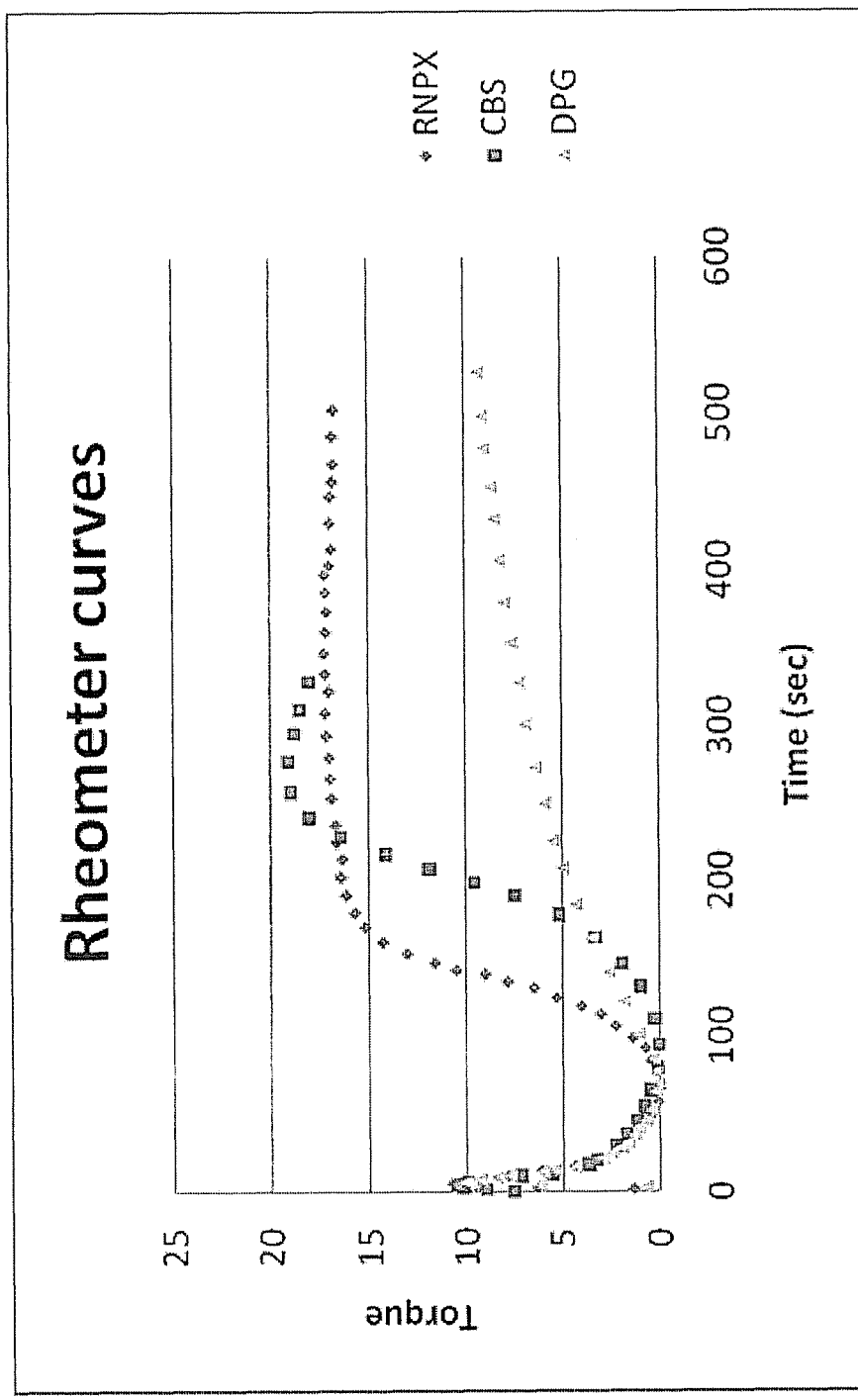
FIG. 4 is a graph showing a rheometer axis of a coated activator of the invention in comparison to controls.

This solid powder is then introduced at a ratio of 1:100 in a low melting point wax product to facilitate dispersion into the rubber matrix upon mixing. The wax used is Struktol® WB222 (an ester of saturated fatty acids available from Struktol Company of America). The resultant product was tested (using mixing compositions reflected in Table 8 below) and the cure behaviour is shown in FIG. 4. The rheometry is done on standard natural rubber and conducted at 150° C.

TABLE 8

| Reagent | RNPX | CBS | DPG |
|---|---|---|---|
| Pure RNPX substrate | 0 | 1.25 | 1.25 |
| RNPX in process wax | 1.25 | 0 | 0 |
| MgO | 1.25 | 0 | 0 |
| CBS | 0.625 | 1.25 | 0 |
| DPG | 0.625 | 0 | 1.25 |
| S8 | 1.25 | 1.25 | 1.25 |

The invention claimed is:

1. A solid substrate coated with a coating containing a complexed acetometallate salt of sodium and transition metal; wherein the solid substrate is in particulate form and comprises particles less than 100 nm in size.

2. The solid substrate as claimed in claim 1, wherein the transition metal is cadmium or zinc.

3. The solid substrate as claimed in claim 2, wherein the transition metal is zinc.

4. The solid substrate as claimed in claim 1, wherein the coating contains a capping agent.

5. The solid substrate as claimed in claim 4, wherein the capping agent is a non-polar capping agent.

6. The solid substrate as claimed in claim 5, wherein the capping agent is selected from 2-mercaptobenzothiazole (MBT), zinc bis(N,N-dimethyldithiocarbamate (ZDMC), diphenylguanidine (DPG), bis-benzothiazole-2,2'-disulfide, N-oxydiethylene-2-benzothiazole-sulfenamide, N-oxydiethylenethiocarbomoyl-N-oxydiethylene sulfenamide, tetramethyl thiuram disulfide, tetramethyl thiuram monosulfide, tetraethyl thiuram disulfide, tetraethyl thiuram monosulfide, tetrabenzyl thiuram disulfide, tetrabenzyl thiuram monosulfide, tetrabutyl thiuram disulfide, tetrabutyl thiuram monosulfide, tetraisopropyl thiuram disulfide, tetraisopropyl thiuram monosulfide, N-cyclohexylthiophthalimide, N-cyclohexyl-2-benzothiazole sulfenamide, N-tert-butyl-2-benzothiazole sulfenamide, 4-morpholinyl-2-benzothiazole disulfide, dipentamethylene thiuram disulfide, dipentamethylene thiuram monosulfide, dipentamethylene thiuram tetrasulfide, 4,4'-dithiomorpholine, 2-mercaptotoluimidazole, ethylene thiourea, trimethylthiourea, 1,3-diethylethiourea, and 1,3-dibutylthiourea, and combinations thereof.

7. The solid substrate as claimed in claim 6, wherein the capping agent is 2-mercaptobenzothiazole (MBT); or zinc bis(N,N-dimethyldithiocarbamate (ZDMC).

8. The solid substrate as claimed in claim 4, wherein the capping agent is a combination of capping agents.

9. The solid substrate as claimed in claim 8, wherein the capping agent is a DPG-MBT reaction product.

10. The solid substrate as claimed in claim 1, wherein the solid particulate substrate particles are 15 nm to 100 nm in size.

11. The solid substrate as claimed in claim 1, wherein the solid substrate is selected from a material that does not hydrolyse.

12. The solid substrate as claimed in claim 1, wherein the solid particulate substrate has a surface area in the range of >20 m2 per gram.

13. The solid substrate as claimed in claim 1, wherein the solid particulate substrate is selected from sulphur, stearic acid, silica, carbon black, titanium dioxide, magnesium oxide, or low weight polymers.

14. The solid substrate as claimed in claim 1, further coated with a hydrophobic coating.

15. The solid substrate as claimed in claim 14, wherein the hydrophobic coating is a wax.

16. The solid substrate as claimed in claim 15, wherein the wax has a melting point of 35 to 70° C.

17. The solid substrate as claimed in claim 15, wherein the wax comprises an ester of saturated fatty acids.

18. The solid substrate as claimed in claim 14, with a substrate to hydrophobic coating ratio (by weight) of 1:50 to 1:150.

19. The solid substrate as claimed in claim 18, with a substrate to hydrophobic coating ratio (by weight) of 1:100.

20. A process for producing a coated solid particulate substrate coated with a complex acetometallate salt of sodium and transition metal; wherein the solid particulate substrate comprises particles less than 100 nm in size; said process including the steps of:
    providing a solution containing a complex acetometallate salt of sodium and transition metal; and
    coating the solid particulate substrate with the solution.

21. The process as claimed in claim 20, wherein the solution containing a complex acetometallate salt of sodium and transition metal is prepared by separating a supernatant solution containing ultra fine nano transition metal oxides and/or sulphides from a solution containing solid transition metal oxides and/or sulphides.

22. The process as claimed in claim 21, wherein the solution containing a complex acetometallate salt of sodium and transition metal is prepared by:
    providing a ternary solvent system comprising a polar solvent, a non-polar solvent and an intermediate solvent allowing miscibility of all three components;
    providing a mixture of a transition metal salt and the ternary solvent;
    providing a mixture of a suitable source of oxide or sulphide and the ternary solvent;
    if necessary providing a mixture of a non-polar end capping agent and the non-polar solvent;
    mixing the mixtures to provide a solution containing transition metal oxide or sulphide particles; and
    separating the transition metal oxide or sulphide particles from the solution to provide a solution containing complex acetometallate salt of sodium and transition metal.

23. The process as claimed in claim 22, wherein the solution containing complex acetometallate salt of sodium and transition metal is removed from the transition metal oxide or sulphide particles as a supernatant solution.

24. The process as claimed in claim 23, wherein the non polar solvent is removed from the solution containing a complex acetometallate salt of sodium and transition metal.

25. The process as claimed in claim 20, wherein the transition metal salt is zinc acetate or cadmium acetate.

26. The process as claimed in claim 25, wherein the transition metal salt is zinc acetate.

27. The process as claimed in claim 21, wherein the source of oxide or sulphur is any one of NaOH, LiOH, KOH, NH4OH, Na2S, Li2S, K2S, H2S and thioacetamide.

28. The process as claimed in claim 27, wherein the source of oxide is NaOH.

29. The process as claimed in claim 22, wherein the nonpolar end capping agent is selected from 2-mercaptobenzothiazole (MBT), zinc bis(N,N-dimethyldithiocarbamate (ZDMC), diphenylguanidine (DPG), bis-benzothiazole-2,2'-disulfide, N-oxydiethylene-2-benzothiazole-sulfenamide, N-oxydiethylenethiocarbomoyl-N-oxydiethylene sulfenamide, tetramethyl thiuram disulfide, tetramethyl thiuram monosulfide, tetraethyl thiuram disulfide, tetraethyl thiuram monosulfide, tetrabenzyl thiuram disulfide, tetrabenzyl thiuram monosulfide, tetrabutyl thiuram disulfide, tetrabutyl thiuram monosulfide, tetraisopropyl thiuram disulfide, tetraisopropyl thiuram monosulfide, N-cyclohexylthiophthalimide, N-cyclohexyl-2-benzothiazole sulfenamide, N-tert-butyl-2-benzothiazole sulfenamide, 4-morpholinyl-2-benzothiazole disulfide, dipentamethylene thiuram disulfide, dipentamethylene thiuram monosulfide, dipentamethylene thiuram tetrasulfide, 4,4'-dithiomorpholine, 2-mercaptotoluimidazole, ethylene thiourea, trimethylthiourea, 1,3-diethylethiourea, and 1,3-dibutylthiourea, and combinations thereof.

30. The process as claimed in claim 29, wherein the nonpolar end capping agent is 2-mercaptobenzothiazole (MBT); or zinc bis(N,N-dimethyldithiocarbamate (ZDMC).

31. The process as claimed in claim 22, wherein the nonpolar end capping agent is a combination of capping agents.

32. The process as claimed in claim 31, wherein the nonpolar end capping agent is a DPG-MBT reaction product.

33. The process as claimed in claim 32, wherein the reaction product of MBT and DPG is formed at 150° C. and reacted for 5 minutes then allowed to cool and form a solid.

34. The process as claimed in claim 20, wherein the solid particulate substrate is selected from a material that does not hydrolyse.

35. The process as claimed in claim 20, wherein the solid particulate substrate has a surface area in the range of >20 m2 per gram.

36. The process as claimed in claim 20, wherein the solid particulate substrate is selected from sulphur, stearic acid, silica, carbon black, titanium dioxide, magnesium oxide, or low weight polymers.

37. The process as claimed in claim 20, wherein the solid particulate substrate comprises particles from 15 nm to 100 nm in size.

38. The process as claimed in claim 20, wherein the amount of the solution that is used for coating the solid substrate is determined according to a coating ratio in the range of from 1:100 to 1:10000, the coating ratio being expressed as the initial mass of transition metal salt: mass of the substrate.

39. The process as claimed in claim 38, wherein the coating ratio is 1:1000.

40. The process as claimed in claim 20, wherein the solid particulate substrate coated with a complex acetometallate salt of sodium and transition metal is further coated with a hydrophobic coating.

41. The process as claimed in claim 40, wherein the hydrophobic coating is a wax.

42. The process as claimed in claim 41, wherein the wax has a melting point of 35 to 70° C.

43. The process as claimed in claim 41, wherein the wax comprises esters of saturated fatty acids.

44. The process as claimed in claim 40, wherein the solid particulate substrate coated with a complex acetometallate salt of sodium and transition metal is further coated with the hydrophobic coating at a ratio (by weight) of 1:50 to 1:150.

45. The process as claimed in claim 44, wherein said ratio is 1:100.

46. A rubber composition containing a filler comprising at least one rubber containing olefinic unsaturation and an inert solid particulate substrate coated with a complex acetometallate salt of sodium and transition metal as defined in claim 1.

47. A method of processing a rubber composition containing at least one rubber containing olefinic unsaturation with an inert solid particulate substrate coated with a complex acetometallate salt of sodium and transition metal as defined in claim 1.

* * * * *